United States Patent [19]

Cerny et al.

[11] 4,251,490
[45] Feb. 17, 1981

[54] CONTROLLED TEMPERATURE PURIFICATION OF AQUEOUS SODIUM HYDROXIDE SOLUTION

[75] Inventors: Rodney A. Cerny, Parma Heights; Robert P. Dolesh, Westlake, both of Ohio

[73] Assignee: The H. K. Ferguson Company, Cleveland, Ohio

[21] Appl. No.: 48,061

[22] Filed: Jun. 13, 1979

[51] Int. Cl.³ .............................................. C01D 1/04
[52] U.S. Cl. .................................. 423/179; 210/774; 210/806; 210/221.2
[58] Field of Search ............. 210/44, 71, 73 R, 221 P; 23/293 R; 423/179, 641

[56] References Cited

U.S. PATENT DOCUMENTS

| | | | |
|---|---|---|---|
| 2,127,496 | 8/1938 | Waldeck | 423/641 |
| 2,178,694 | 11/1939 | Muskat et al. | 23/299 |
| 2,699,377 | 1/1955 | Dancy et al. | 423/641 |
| 2,780,360 | 2/1957 | Bon et al. | 210/44 |
| 2,920,763 | 1/1960 | Lind et al. | 210/44 |
| 3,015,396 | 1/1962 | Quast | 210/44 |
| 3,390,076 | 6/1968 | Dubach | 210/13 |
| 3,446,353 | 5/1969 | Davis | 209/164 |
| 3,448,044 | 6/1969 | Garrett | 210/13 |
| 3,799,749 | 3/1974 | Moyer et al. | 423/641 |
| 4,065,270 | 12/1977 | Nakaya et al. | 423/641 |

Primary Examiner—O. R. Vertiz
Assistant Examiner—Wayne A. Langel
Attorney, Agent, or Firm—Shanley, O'Neil and Baker

[57] ABSTRACT

Methods and apparatus are disclosed for enhanced purification of caustic soda solutions. In place of conventional mechanical separators, flotation separation methods are taught utilizing sequential multi-temperature sparging gas treatments. A first stage treatment, at about 70° F.–90° F., provides separation of sodium chloride and a subsequent stage, higher temperature (about 90° F.–100° F.) treatment provides enhanced removal of suspended sodium sulfate. Sensible heat is added to sparging gas to offset the cooling effect of gas expansion in a treatment tank and avoid crystallization of dissolved impurities from saturated solutions on sparging gas nozzles.

10 Claims, 2 Drawing Figures

CONTROLLED TEMPERATURE PURIFICATION OF AQUEOUS SODIUM HYDROXIDE SOLUTION

This invention is concerned with purification of an aqueous solution of an alkali metal hydroxide which contains suspended solid impurities and, in particular, with use of temperature control for preferential separation of impurities. In its specific aspects, the invention is concerned with sequential gas flotation treatment for separation of salt crystals from an aqueous solution of sodium hydroxide.

Sodium hydroxide is generally produced by electrolysis of brine; typically, diaphragm cell electrolysis is used in commercial practice. The caustic soda solution produced in such chlor-alkali plants is usually concentrated in evaporators before purification with precipitation of sodium chloride and sodium sulfate occurring. In concentrated caustic solutions—33% and higher, a triple salt of sodium chloride, sodium sulfate and sodium hydroxide can also be formed and precipitated with increasing concentrations of the caustic solution.

The quality of the caustic soda product depends on the effectiveness of impurity separation in the final stages which, in the past, has been accomplished by chiefly filtering. Centrifuges and other mechanical means have been used; however, these have not been considered as effective as filters in meeting commercial product purity specifications.

While filters are efficient product purifiers, they are costly and troublesome to operate and maintain in caustic soda plants. Fine crystal impurities cause plugging problems and shorten filter cycles. Coarser crystal impurities cause bridging problems which can damage filters. Notwithstanding the cost and maintenance difficulties associated with the use of filters and long-standing recognition of these difficulties, filtering has been relied on in commercial practice for achieving required purity standards.

The present invention substantially eliminates any dependence on filters for separation of solid impurities. Further, cost and maintenance difficulties are overcome in a manner readily and economically adaptable to continuous operations.

The present invention includes unique gas-sparging and flotation-froth separation teachings which readily enable reduction of salt and sulfate impurities of caustic soda solutions to the usually required standard specifications. In addition, other solid impurities such as ferric oxide, present in varying degrees dependent on the plant and operating practice, can also be reduced.

The invention can be completely integrated with caustic soda production plants and provides for economic separation and recycling of froth liquor to minimize discharge of separated salt crystals to environment in the final purification process.

An important contribution is the enhanced purification of caustic soda solutions available by use of selective temperature control of multi-stage treatments. Better separation of suspended salt and sulfate impurities from sodium hydroxide solutions is provided by multi-temperature, gas flotation treatments of the solution; the separation of salt and sulfate impurities achieved at preferential temperatures enables product purity specifications to be met efficiently and economically.

These and other advantages and contributions are covered in describing the invention in more detail by reference to the accompanying drawings; in these drawings.

It has been discovered that significantly better purification is achieved by controlling the gas flotation treatment temperature for removal of salt crystals within a lower temperature range followed by gas flotation treatment to remove suspended sulfate within a higher temperature range. A first stage solution retention chamber is provided for the lower temperature gas flotation froth separation treatment. Removal of salt predominates in this first stage. The solution is then treated in a subsequent stage solution retention chamber in which the gas-flotation, froth-separation treatment is carried out within a higher temperature range. Removal of the remainder of the sulfates and/or triple salts is effected in the latter stage.

Figure 1:
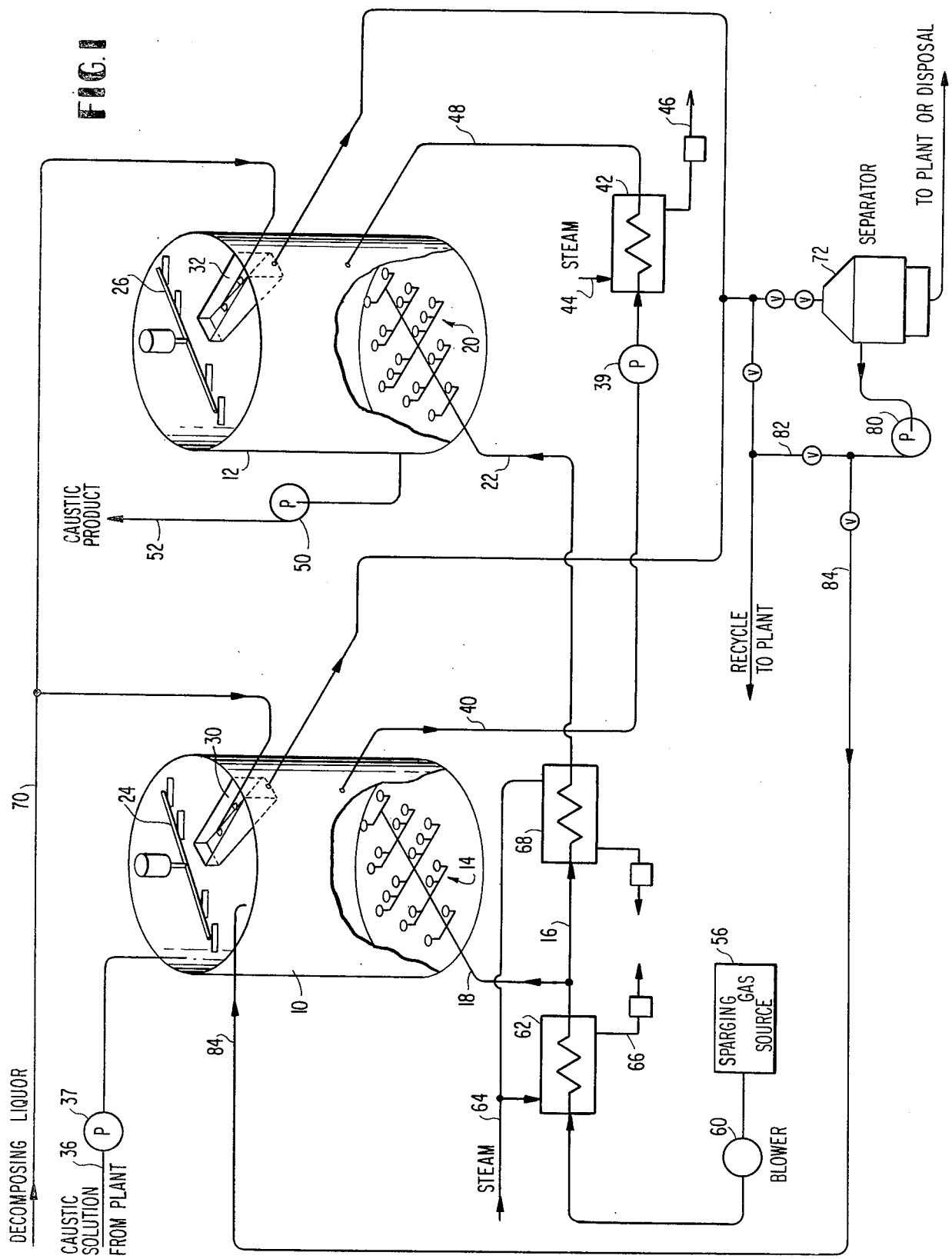
FIG. 1 is a schematic perspective view of apparatus embodying the invention.

The retention means for treatment of solution can take the form of individual flow-through chambers or can be compartmented cells within a single tank for purposes of providing sequential treatments. In the embodiment of FIG. 1, a first stage solution retention tank 10 is connected in series with a second stage solution retention tank 12.

Gas-sparging, flotation-froth separation apparatus is provided in each stage. Tank 10 includes an array of sparging gas devices 14 connected to sparging gas supply 16 by pipe 18. Tank 12 includes an array of sparging gas devices 20 connected to conduit 16 by pipe 22.

Sparging gas is introduced into each tank and, through the action of the sparging devices, small gas bubbles are formed and distributed in each tank. The gas bubbles float suspended solids to the upper surface of the solution in each tank. The flow rates of solution and sparging gas are selected to provide desired retention time of solution in each tank and desired sparging gas contact with the solution.

Froth skimming apparatus 24 and 26 are provided in tanks 10 and 12, respectively. Rotating skimmers direct the foam-like froth of gas bubbles and solid impurities from the upper surface of the solution in each tank into troughs 30 and 32 in tanks 10 and 12, respectively.

Caustic soda solution to be treated can be supplied from a chlor-alkali plant, or other source (not shown) through solution supply conduit 36 by a flow control pump 37. The solution is provided in the desired temperature range of about 70° F. up to about 90° F., e.g. at about 75° F., from the plant by control of temperature during evaporation. The caustic solution to be treated is fed at the desired temperature into the first stage solution retention tank 10. Desired retention time and sparging gas contact are provided in tank 10. The solution is removed, e.g. by flow control pump 39 in conduit 40. A second sparging gas-flotation froth separation treatment is then applied.

The subsequent stage, higher-temperature treatment substantially enhances sulfate removal and provides a significant contribution to the improved purification results available with the invention. Sequential treatments are provided by connecting the solution retention tanks in series. The solution from the first stage treatment in tank 10 is directed through heat exchanger 42 for heating to provide desired temperature treatment in the second stage retention tank 12. The source of heat for heat exchanger 42 can, for example, be steam from line 44; drain line 46 which includes a steam trap provides for discharge of condensate.

The solution heated to the desired temperature for second stage gas flotation treatment is directed through conduit 48 into tank 12. Solution feed rates and removal rates are controlled, and coordinated with retention tank volumes, to provide desired retention time in each tank.

The caustic product, purified to the desired level, is removed from tank 12 by pump 50 and delivered for recovery through conduit 52.

In the embodiment of FIG. 1, pressurized sparging gas is fed directly into the solution retention treatment tanks through sparging nozzles. A further important aspect of the invention involves eliminating crystallization of solutes from saturated solutions. The pressurized sparging gas, upon expansion within the retention tanks, can have a cooling effect upon the solution. To avoid crystallization problems, the invention provides for adding sensible heat to the sparging gas before injection into the tanks. Heat additions to the sparging medium are controlled to offset the cooling effect and avoid crystallization of impurities from saturated solutions which can deposit on sparging nozzles and impede bubble formation or the distribution of gas bubbles desired.

Heat requirements commensurate with the cooling effect of the expanding gas within the tanks are considered in the overall treatment temperature control. Sensible heat can be added to the sparging medium preliminary to its introduction into the system. In FIG. 1, the sparging gas from source 56 is fed into the line at the desired pressure by blower 60. Heat is added to the sparging gas in heat exchanger 62, e.g. by steam from line 64; condensate is discharged through line 66. Conduit 60 can include a supplemental heat exchanger 68 for better control of heat additions to the sparging gas for tank 12.

A brine or weak caustic solution available from the caustic solution plant or other source provided through conduit 70 can be used to facilitate breaking down the froth and separating the salt and sulfate solids in separator 72. Such a solution, when under 33% by weight of sodium hydroxide, decomposes the triple salts to solid salt and sulfate and liquid caustic; thus recovering the caustic value combined with the triple salt impurity in solution. The froth from first stage tank 10, which contains predominantly salt impurities, is directed through conduit 74 to separator 72 and the froth from trough 32, which contains predominantly sulfate solids, is directed through conduit 76. Individual separators can be provided for separate recovery of the salts and sulfates if desired. The liquor remaining after recovery of the solids is returned by pump 80. Such froth liquor can be returned through line 82 for recycling in the plant or, through line 84 for recycling through the purification means by being directed, initially, to the first stage retention tank 10. Valving is provided in the conduits to and from separator 72 to enable optional handling of the froth and/or froth liquor.

Figure 2:
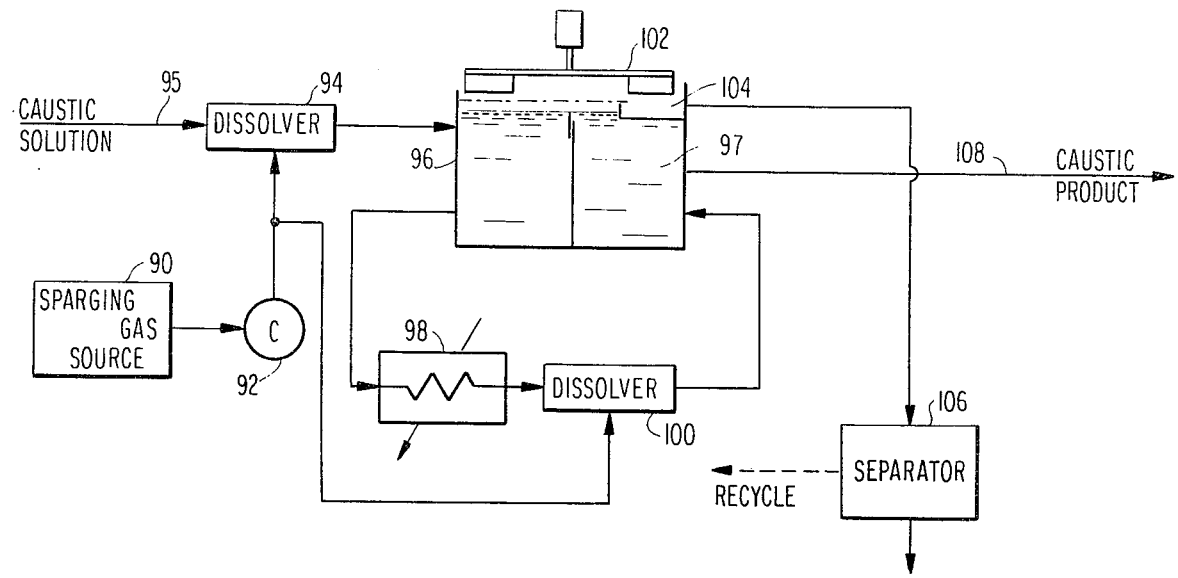
FIG. 2 is a schematic view of another embodiment for carrying out the invention.

In FIG. 2, the sparging medium from source 90 is delivered through compressor 92 to dissolver 94 for dissolving into the caustic soda solution delivered by supply conduit 95. Sparging gases held in the caustic soda solution are released during the retention at the lower pressure, e.g. atmospheric, of the solution retention means.

The caustic soda solution is directed to the first stage retention cell 96. Before being directed to the second stage retention cell 97, the solution is heated to the desired temperature in heat exchanger 98 and a sparging medium is dissolved into the solution at dissolver 100.

Sparging gas released from solution in retention cell 97 forms small gas bubbles which float suspended sulfates to the surface.

Solid impurities are skimmed at the surface by skimming apparatus 102, gathered in trough 104, and removed to separator 106. The froth is broken down in separator 106 with the froth liquor being recycled to the caustic solution plant or recycled in the first stage for purification treatment.

Figure 3:
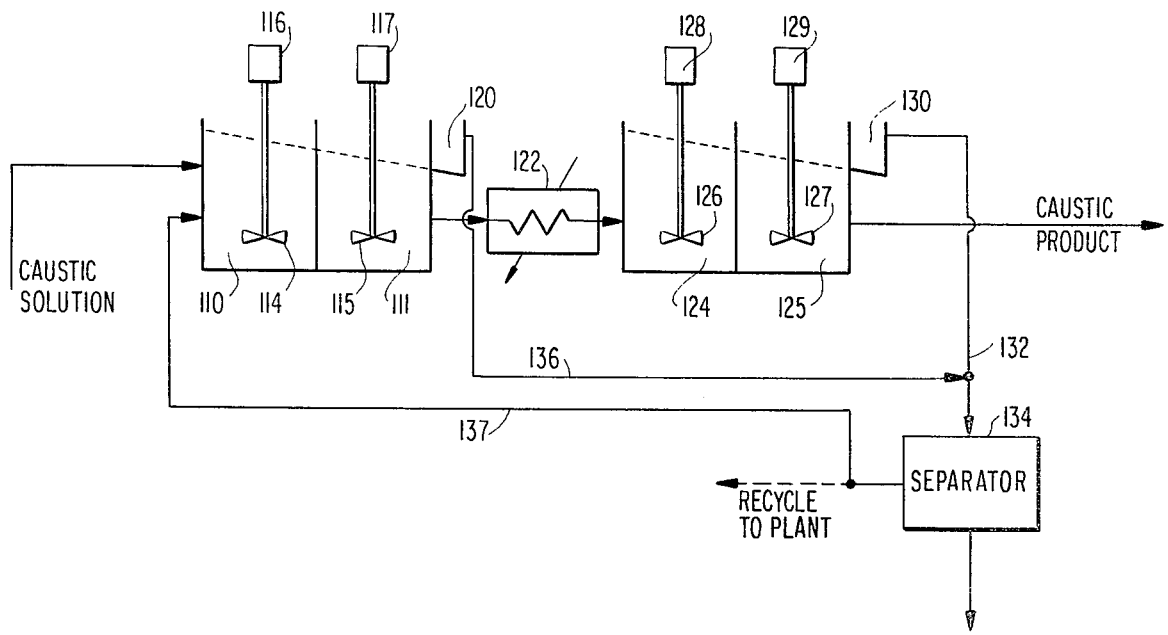
FIG. 3 is a schematic view of a further embodiment for carrying out the invention.

In the embodiment of FIG. 3, each of the multistages includes a plurality of cells. Caustic soda solution, at a selected predetermined temperature, with dissolved sparging gas, is introduced to cells 110, 111. Disperser-agitators 114, 115, driven by motors 116, 117, cause release and dispersion of sparging gas bubbles in each cell and help significantly in reducing required retention time. Flotation froth is removed in trough 120.

The solution from the first stage cells 110, 111 is heated to the selected desired temperature in heat exchanger 122 and directed to the second stage which includes solution retention cells 124, 125. A sparging medium can also be added between stages when required for desired gas bubble formation in the second stage. As in the first stage, sparging gas bubbles are released and dispersed by disperser-agitators 126, 127 driven by motors 128, 129, respectively. Flotation froth is removed through trough 130 and directed by conduit means 132 to separator 134. Flotation froth from trough 120 in the first stage is delivered via conduit 136 to separator 134 or, its own separator can be provided. Froth liquor can be recycled through the caustic solution plant or recycled to the first stage of the purification system by delivery in conduit 137. A sparging medium is dissolved into the caustic soda solution of the plural cell multi-stage embodiment as shown in FIG. 3 but could also be introduced into each cell as a gas.

The present invention is not limited to purification of chlor-alkali plant solutions but can be used to purify sodium hydroxide solutions from other sources. The temperature control teachings of the invention are particularly effective with sodium hydroxide concentration levels at which the hydroxide is in liquid solution. Typically, these include caustic soda concentrations up to about 52 wt.% NaOH and are referred to commercially as nominal 50% sodium hydroxide solutions. Nominal 50% NaOH solution generally contains about 48 wt.% to about 52 wt.% NaOH with the balance of the constituents being water, soluble impurities, and suspended solids.

Ordinarily, purification specifications for such caustic soda solution call for no more than about 1.10 to 1.15 wt.% total salt and not more than about 500 ppm total sulfate. These specifications are readily achieved by the invention, without the use of filters, on solutions having impurity levels initially extending up to five, and higher, wt.% salt and up to 5000, and higher, ppm sulfate.

In general, the caustic soda solution from a chlor-alkali plant will contain about 2 to 3 wt.% salt, with about 1% in solution and, about 4000 ppm sulfate, with about 200 ppm in solution. The temperature treatment in the first stage is controlled to be in the range of about 70° F. to approximately 90° F. to provide preferential and increased salt removal; for example, at about 75° F., suspended salt crystals are substantially completely removed in the first stage leaving less than about 1.10 wt.% total salt remaining. The second stage sparging gas flotation froth separation for removal of suspended sulfates is carried out at a higher temperature range from 90° F. to about 105° F.; for example, at about 95° F., suspended sulfates are substantially completely removed leaving about 200 ppm total sulfate.

Solution flow rates, sparging gas release (gas flow rate at selected temperature and atmospheric pressure), retention time, and other factors related to equipment design such as hydraulic and solids loadings are determined or selected as required to remove solid impurities to desired specifications.

The ratio of sparging gas rate to solution flow rate per unit time, together with retention time, serves as a useful guide in relating solids removal performance with the flotation methods described. For example, six cells of 50 cubic feet volume in a stage provides a total retention volume of 300 cubic feet. Using a solution feed rate of 50 cubic feet per minute, the total retention time is six minutes and a gas sparging rate of 150 cubic feet per minute establishes satisfactory solids removal in each stage operating at differential temperatures. The ratio of gas flow (cfm at selected temperature and atmospheric pressure) to solution flow (gpm) in the example is 3.0. With the invention, gas to solution ratios from three to about five are effective in meeting performance requirements. This data together with knowledge of the other factors, such as solids loading or the percent solids weight in the feed solution stream, enables one skilled in the art to practice the invention.

For economic and practical reasons, air would be used as the sparging gas although other gases, such as nitrogen, can be selected for the process without detracting from the basic concept of the invention on utilization of temperature control for enhanced purification purposes. Agitation in the dispersed gas method disperses gas bubbles through the solution in a manner which significantly reduces retention time over that required for a static or direct sparging method.

The embodiments shown and described are representative, but not exhaustive, of the selections available to those skilled in the art in the light of the present teachings. Treatment temperature control can be accomplished by other methods and means than specifically described, e.g. temperature control can be augmented through tank jackets or other chamber and solution temperature control means. Since various modifications in the arrangement of equipment shown and in operational values presented can be made by use of the principles disclosed, the scope of the invention should be evaluated by reference to the appended claims.

We claim:

1. Process for multi-stage separation of solid suspended impurities from an aqueous solution of sodium hydroxide comprising the steps of providing an aqueous solution of sodium hydroxide, said solution having impurities above a desired level including suspended solids, providing sequential gas-flotation treatments for separation of suspended solids by bubble formation of a sparging gas in contact with said solution, including controlling the temperature of said sequential treatments such that the temperature of an initial treatment is at a lower treatment than that of a subsequent treatment, the temperature of said initial treatment being in the range of from about 70° F. to about 90° F., and the temperature of said subsequent treatment being in the range of from about 90° F. to about 100° F., and recovering the treated aqueous solution of sodium hydroxide having a desired purity level.

2. Continuous process for purification of an aqueous solution of sodium hydroxide by multi-stage gas-flotation separation of suspended solid impurities, comprising the steps of providing an aqueous solution of sodium hydroxide containing up to about 52 wt.% sodium hydroxide with sodium chloride and sodium sulfate impurities above a desired level, injecting a sparging medium into said aqueous solution, providing a first stage gas-flotation, froth-separation solution retention means for treatment of the aqueous solution of sodium hydroxide, controlling feeding and removal rates of said solution to provide a desired retention time in said first stage solution retention means during which sparging gas bubbles are formed and float suspended solids upwardly in said first stage solution retention means, controlling treatment temperature in said first stage solution retention means to be in the range of from about 70° F. to about 90° F., providing a second stage gas-flotation, froth-separation solution retention means for treatment of the aqueous solution of sodium hydroxide from said first stage solution retention means, controlling feeding and removal rates of said aqueous solution of sodium hydroxide from said first stage solution retention means to provide a desired retention time in said second stage solution retention means during which sparging gas bubbles are formed and float suspended solid impurities upwardly in said second stage solution retention means, controlling treatment temperature in said second stage solution retention means to be in the range of from about 90° F. to about 100° F. and to be higher than the treatment temperature in said first stage solution retention means, and recovering an aqueous solution of sodium hydroxide of desired purity level from said second stage solution retention means.

3. The process of claim 1 or 2 in which the salt content of the aqueous solution of sodium hydroxide provided for purification is reduced to 1.15 wt. percent or lower in the aqueous solution of sodium hydroxide recovered.

4. The process of claim 1 or 2 in which the aqueous solution of sodium hydroxide provided for purification includes up to 5,000 ppm sodium sulfate which is reduced to 500 ppm or lower in the aqueous solution of sodium hydroxide recovered.

5. The process of claim 2, in which the sparging medium comprises a sparging gas and the first stage solution retention means has a predetermined volume, including the step of controlling the sparging gas flow rate in cfm at selected temperature and atmospheric pressure and the flow rate of the aqueous solution of sodium hydroxide in gpm so that the ratio of said gas flow rate in cfm said solution flow rate in gpm is in the range of from about three to about five.

6. The process of claim 5 in which the second stage solution retention means has a predetermined volume, including the step of
controlling the sparging gas flow rate into said second stage in cfm at selected temperature and atmospheric pressure and the flow rate of the aqueous solution of sodium hydroxide in gpm so that the ratio of said gas flow rate in cfm to said solution flow rate in gpm in the range of from about three to about five.

7. The process of claim 2 including
removing flotation-froth from the first and second stage solution retention means, and
separating solids from said flotation froth to provide a froth liquor for recycling.

8. The process of claim 7 in which the step of separating solids from said flotation froth includes the step of
adding a solution to said flotation froth to decompose triple salt crystals in said froth.

9. The process of claim 2 in which the sparging medium is injected into the first and second stage solution retention means as a gas at a pressure above that of said first and second stage solution retention means, further including the step of
adding heat to said sparging gas prior to injection into said first and second stage solution retention means.

10. The process of claim 9 including
controlling heat additions to the sparging gas to offset expansion cooling effects of sparging gas in said first and second stage solution retention means to substantially eliminate crystallization of solutes from solution due to injection of sparging gas.

* * * * *